(12) United States Patent  
Cui et al.

(10) Patent No.: US 12,374,141 B2  
(45) Date of Patent: Jul. 29, 2025

(54) SEMANTIC REPRESENTATION OF TEXT IN DOCUMENT

(71) Applicant: Microsoft Technology Licensing, LLC, Redmond, WA (US)

(72) Inventors: Lei Cui, Beijing (CN); Shaohan Huang, Beijing (CN); Li Dong, Beijing (CN); Furu Wei, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/926,996

(22) PCT Filed: Jun. 12, 2020

(86) PCT No.: PCT/CN2020/095942  
§ 371 (c)(1),  
(2) Date: Nov. 22, 2022

(87) PCT Pub. No.: WO2021/248492  
PCT Pub. Date: Dec. 16, 2021

(65) Prior Publication Data  
US 2023/0206670 A1    Jun. 29, 2023

(51) Int. Cl.  
*G06V 30/262*      (2022.01)  
*G06F 40/30*      (2020.01)  
(Continued)

(52) U.S. Cl.  
CPC ............ *G06V 30/262* (2022.01); *G06F 40/30* (2020.01); *G06V 10/50* (2022.01); *G06V 10/82* (2022.01);  
(Continued)

(58) Field of Classification Search  
CPC .............................. G06V 30/262; G06F 40/30  
See application file for complete search history.

(56) References Cited

U.S. PATENT DOCUMENTS 8,804,139 B1 * 8/2014 Arora .................... G06F 3/1285  
                                                                      358/1.9  
2011/0264705 A1 * 10/2011 Diamond ............. G11B 27/034  
                                                                      715/730  
(Continued)

FOREIGN PATENT DOCUMENTS

CN         101937438 A      1/2011  
CN         107077458 A      8/2017  
(Continued)

OTHER PUBLICATIONS

Office Action Received for Chinese Application No. 202080101969.1, mailed on May 15, 2024, 17 pages (English Translation Provided).

(Continued)

*Primary Examiner* — Kevin Ky  
(74) *Attorney, Agent, or Firm* — Schwegman Lundberg & Woessner, P.A.

(57) ABSTRACT

There is provided a solution for semantic representation of text in a document. In this solution, textual information comprising a sequence of text elements (220) and layout information (230) of the text element are determined from a document. The layout information (230) indicates a spatial arrangement of the plurality of text elements (220) presented within the document. Based at least in part on the plurality of text elements (220) and the layout information (230), respective semantic feature representations (180) of the plurality of text elements (220) are generated. By jointly using both the textual information and the layout information (230), rich semantics of the text elements (220) in the document can be effectively captured in the feature representations.

17 Claims, 7 Drawing Sheets

(51) Int. Cl.
*G06V 10/50* (2022.01)
*G06V 10/82* (2022.01)
*G06V 30/14* (2022.01)
*G06V 30/19* (2022.01)
*G06V 30/412* (2022.01)

(52) U.S. Cl.
CPC .... *G06V 30/1448* (2022.01); *G06V 30/19147* (2022.01); *G06V 30/412* (2022.01)

(56) References Cited

U.S. PATENT DOCUMENTS

| | | |
|---|---|---|
| 2013/0188875 A1 | 7/2013 | Sesum et al. |
| 2014/0257789 A1 | 9/2014 | Zaric et al. |
| 2018/0060306 A1* | 3/2018 | Starostin ................. G06F 40/30 |
| 2018/0157642 A1* | 6/2018 | Matskevich .......... G06F 40/211 |
| 2018/0157747 A1* | 6/2018 | Tiwary .................. G06F 16/951 |
| 2018/0181855 A1* | 6/2018 | Johnson, Jr. ........ G06F 16/9032 |
| 2018/0267958 A1* | 9/2018 | Danielyan ............ G06F 40/289 |
| 2019/0026550 A1 | 1/2019 | Yang |
| 2019/0073345 A1 | 3/2019 | Jain et al. |
| 2019/0294672 A1* | 9/2019 | Matskevich .......... G06F 40/279 |
| 2019/0392035 A1 | 12/2019 | Indenbom |
| 2020/0042579 A1* | 2/2020 | Ben-Ishay ............ G06F 40/166 |
| 2020/0042606 A1* | 2/2020 | Ben-Ishay ............ G06F 40/134 |
| 2020/0110835 A1* | 4/2020 | Zhao ........................ G06N 5/022 |
| 2020/0125751 A1* | 4/2020 | Hariharasubrahmanian ................ H04L 9/3247 |
| 2020/0382612 A1* | 12/2020 | Zhao ......................... G06N 3/08 |
| 2021/0049357 A1* | 2/2021 | Sarkar .................... G06N 3/044 |
| 2021/0334708 A1* | 10/2021 | Li ............................ G06F 40/40 |

FOREIGN PATENT DOCUMENTS

| | | |
|---|---|---|
| CN | 110866388 A | 3/2020 |
| CN | 111079442 A | 4/2020 |
| EP | 3570208 A1 * | 11/2019 ......... G06K 9/00449 |

OTHER PUBLICATIONS

Second Office Action Received for Chinese Application No. 202080101969.1, mailed on Sep. 5, 2024, 17 pages (English Translation Provided).
"International Search Report and Written Opinion Issued in PCT Application No. PCT/CN20/095942", Mailed Date: Mar. 10, 2021, 10 Pages.
Extended European Search Report received for EP Application No. 20939555.7, mailed on Date Dec. 15, 2023, 7 pages.
Qiao, et al., "Question answering method based on question generation", Intelligent Computer and Applications, vol. 10, Issue No. 05, May 30, 2020, 05 Pages.
Rejection Decision Received for Chinese Application No. 202080101969.1, mailed on Feb. 27, 2025, 30 pages (English Translation Provided).
Ren Ying, "Power Grid A Classification Model of Power Work Orders Texts Based on Pre-trained BERT Model", Yunnan Electric Power, vol. 48, Issue No. 01, Jan. 31, 2020, pp. 2-7.
Xiao, et al., "Named Entity Recognition based on ERNIE", Intelligent Computer and Applications, vol. 10, Issue No. 03, Mar. 31, 2020, pp. 21-26.
Communication pursuant to Rules 70(2) and 70a(2) EPC received for EP Application No. 20939555.7, mailed on Jan. 9, 2024, 1 page.

* cited by examiner

| IMAGE BLOCK | TEXT ELEMENT | BOUNDING BOX (X0, Y0, X1, Y1) |
|---|---|---|
| Date | Date | 86 138 112 148 |
| Routed: | Routed: | 117 138 162 148 |
| January | January | 227 138 277 153 |
| 11, | 11 | 281 138 293 148 |
| 1994 | 1994 | 303 139 331 149 |
| Contract | Contract | 415 138 464 149 |
| No. | No. | 468 139 583 150 |
| 4011 | 4011 | 556 139 583 150 |
| 00 00 | 0000 | 589 139 621 150 |

FIG. 3

SEMANTIC REPRESENTATION OF TEXT IN DOCUMENT

CROSS-REFERENCE TO RELATED APPLICATION

This application is a U.S. National Stage Filing under 35 U.S.C. 371 of International Patent Application Serial No. PCT/CN2020/095942, filed Jun. 12, 2020, and published as WO 2021/248492 A1 on Dec. 16, 2021, which application and publication are incorporated herein by reference in their entirety.

BACKGROUND

Document artificial intelligence (AI) or document intelligence is a trending application area that uses techniques to automatically read, understand, and analyze documents. Documents may be digital-born, occurring as electronic files, or contain images captured from written or printed paper. Examples of documents include purchase orders, financial reports, business emails, sales agreements, vendor contracts, letters, invoices, receipts, resumes and many others. Understanding and analyzing documents especially business documents can greatly facilitate people's daily life and enhance business efficiency and productivity. Formats and layouts of documents may vary, from plain text to a wide variety of columns, charts, and figures, etc. Nonetheless, information contained in a document is usually presented in natural language. Typically, document understanding, especially those containing images, involves text recognition and natural language processing.

SUMMARY

According to implementations of the subject matter described herein, there is provided a solution for determining a semantic representation of text in a document. In this solution, textual information comprising a sequence of text elements and layout information of the text elements are determined from a document. The layout information indicates a spatial arrangement of the sequence of text elements presented within the document. Based at least in part on the text elements and the layout information, respective semantic feature representations of the text elements are generated.

The Summary is to introduce a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

FIG. 3 illustrates an example of extracting information from a document in accordance with some implementations of the subject matter described herein;

Throughout the drawings, the same or similar reference symbols refer to the same or similar elements.

DETAILED DESCRIPTION OF IMPLEMENTATIONS

Figure 1:
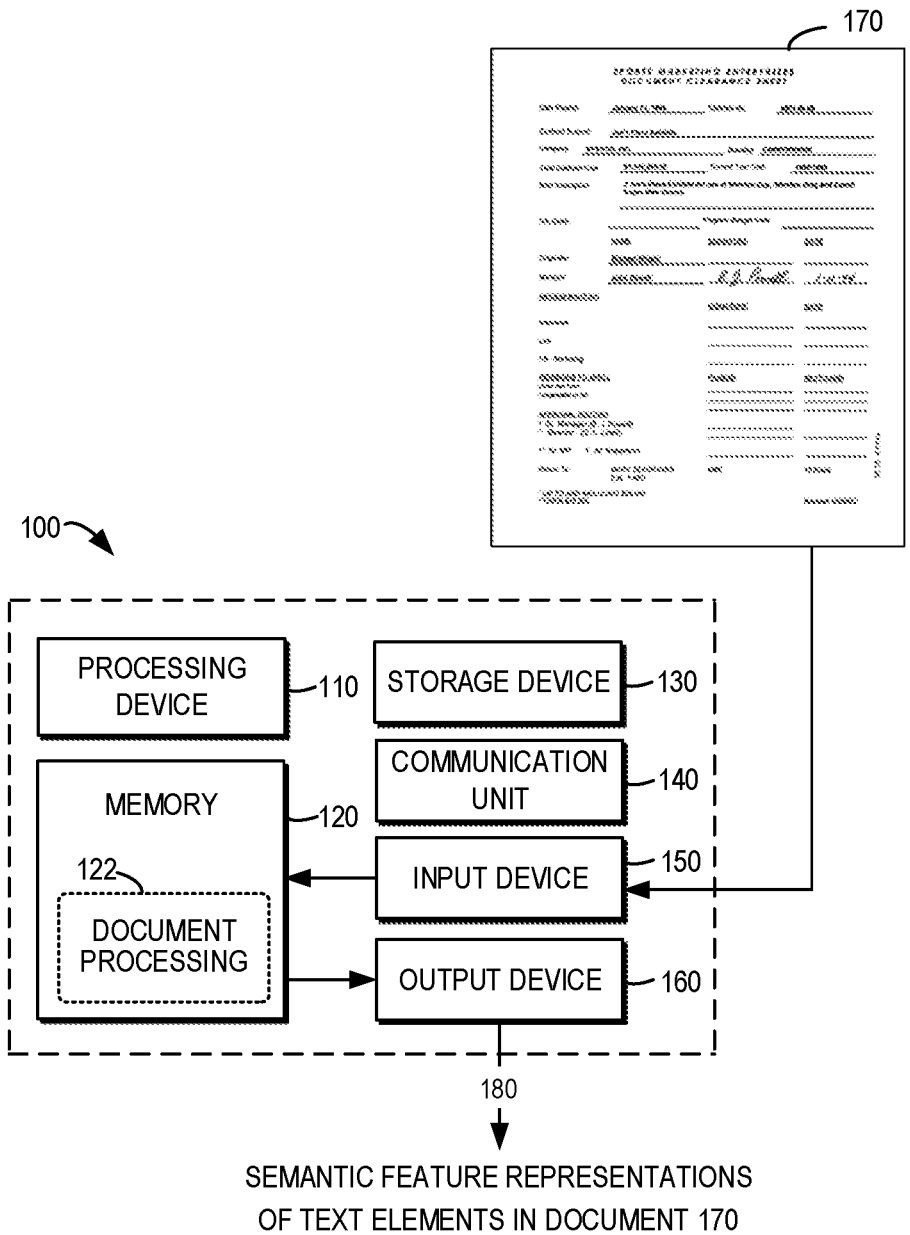
FIG. 1 illustrates a block diagram of a computer environment in which various implementations of the subject matter described herein can be implemented.

Principles of the subject matter described herein will now be described with reference to some example implementations. It is to be understood that these implementations are described only for the purpose of illustration and help those skilled in the art to better understand and thus implement the subject matter described herein, without suggesting any limitations to the scope of the subject matter disclosed herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, a "deep learning model" is an AI model, which may also be referred to as a "learning model", "learning network", "network model", or "model." These terms are used interchangeably hereinafter. A "neural network" or "neural network model" is an example deep learning model. A parameter set of the deep learning model is determined through a training phrase of the model based on training data. The trained deep learning model maps a received input to a corresponding output using the trained parameter set. Therefore, the training process of a deep learning model may be considered as learning, from the training data, a mapping or association between the input and the output.

As mentioned above, to understand documents especially documents in form of images, texts are required to be recognized and provided for processing. Nowadays, data are extracted from documents through manual efforts which are time-consuming and prone to error, meanwhile requiring manual customization or configuration. Rules and workflows for each type of document often need to be hard-coded and updated with changes to the specific format or when dealing with multiple formats. To address these problems, document AI models and algorithms are designed to automatically classify, extract and structuralize information from documents, accelerating automated document processing workflows.

Most of the existing document AI models and algorithms require recognizing information, more importantly, textual information, from the document images by means of techniques such as optical character recognition (OCR), and then processing the textual information purely from a natural language processing (NLP) perspective by leveraging various NLP models to explore semantics of the textual information. However, as most of the NLP models focus on text-level manipulation only and trained based on single text modal, the results may not be suitable for following tasks specific to the document images, such as document image classification, form understanding, and the like.

According to implementations of the subject matter described herein, there is proposed a solution for text processing in a document, for example, a document image. In this solution, both textual information comprising a set of text elements and layout information of the text elements are determined from a document. The layout information indicates a spatial arrangement of the text elements within the document, for example, by respective positions of the text elements within the document. The set of text elements and the layout information are jointly used to generate respective semantic feature representations of the text elements.

The spatial arrangement of the respective text elements such as words or phrases within the document contributes a lot to the semantic of the text elements in the document. By jointly using both the textual information and the layout information, rich semantics of the text elements can be effectively captured into the feature representations. The generated feature representations, when used in downstream processing tasks, can improve performance and accuracy of the tasks with the rich semantics.

FIG. 1 illustrates a block diagram of a computing device 100 in which various implementations of the subject matter described herein can be implemented. It would be appreciated that the computing device 100 as shown in FIG. 1 is merely provided as an example, without suggesting any limitation to the functionalities and scope of implementations of the subject matter described herein.

As shown in FIG. 1, the computing device 100 is in form of a general-purpose computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 may be implemented as any of a variety of user terminals or servers. A server may be any server, large-scale computing device, and any other devices provided by various service providers. A user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, radio broadcast receiver, E-book device, gaming device, or any combination thereof, including the accessories and peripherals of these devices, or any combination thereof. It is also contemplated that the computing device 100 can support any type of interface to a user (such as "wearable" circuitry and the like).

The processing unit 110 can be a physical or virtual processor and can implement various processes based on programs stored in the memory 120. In a multi-processor system, multiple processing units execute computer-executable instructions in parallel so as to improve the parallel processing capability of the computing device 100. The processing unit 110 may also be referred to as a central processing unit (CPU), a microprocessor, a controller, or a microcontroller.

The computing device 100 usually includes various computer storage medium. The computer storage medium may be any available medium accessible by the computing device 100, including but not limited to, volatile and non-volatile medium, or detachable and non-detachable medium. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any detachable or non-detachable medium and may include machine-readable medium such as a memory, a flash drive, a magnetic disk, or any other medium, which can be used for storing information and/or data and are accessible by the computing device 100.

The computing device 100 may further include additional detachable/non-detachable, volatile/non-volatile storage medium. Although not shown in FIG. 1, it is possible to provide a drive to read from and/or write to a detachable and non-volatile disk or disc. In such case, each drive may be connected to a bus (not shown) via one or more data medium connections.

The communication unit 140 communicates with a further computing device via communication medium. In addition, the functions of components in the computing device 100 may be implemented by a single computing cluster or multiple computing machines that can communicate with each other via communication connections. Therefore, the computing device 100 can operate in a networked environment using logic connections with one or more other servers, network personal computers (PCs), or further network nodes.

The input device 150 may include one or more of a variety of input devices, such as a mouse, keyboard, tracking ball, voice-input device, and the like. The output device 160 may include one or more of a variety of output devices, such as a display, loudspeaker, printer, and the like. Through the communication unit 140, the computing device 100 can further communicate with one or more external devices (not shown) such as storage devices and display devices, one or more devices that enable the user to interact with the computing device 100, or any devices (such as a network card, a modem and the like) that enable the computing device 100 to communicate with one or more other computing devices, if required.

Such communication may be performed via input/output (I/O) interfaces (not shown).

In some implementations, as an alternative of being integrated in a single device, some or all components of the computing device 100 may also be arranged in form of cloud computing architecture. In the cloud computing architecture, the components may be provided remotely and work together to implement the functionalities provided in the subject matter described herein. In some implementations, the cloud computing provides computing, software, data access and storage services, without requiring end users to be aware of the physical locations or configurations of the systems or hardware provisioning these services. In various implementations, the cloud computing provides the services via a wide area network (such as Internet) using suitable protocols. For example, a cloud computing provider provisions an application over the wide area network, which can be accessed via a web browser or any other computing components. The software or components of the cloud computing architecture and corresponding data may be stored remotely in servers. The computing resources in the cloud computing environment may be aggregated or distributed at various locations of remote data centers. Cloud computing infrastructure may provision the services through a shared data center, though they act as a single access point for the users. Therefore, the cloud computing architecture may be used to provide the components and functionalities described herein from a service provider at a remote location. Alternatively, they may be provided from a conventional server or may be installed directly or otherwise on a client device.

The computing device 100 can be used to implement text processing in document images according to various implementations of the subject matter described herein. The memory 120 may include one or more modules having one or more program instructions. These modules can be accessed and executed by the processing unit 110 to perform the functionalities of various implementations described herein. For example, the memory 120 may include a document processing module 122 for text processing in documents.

The computing device 100 can receive a document 170 having text present therein, via the input device 150. In the shown example, the document 170 is a scanned image. It would be appreciated that the example document shown in FIG. 1 is provided for the purpose of illustration only without suggesting any limitation to the scope of the subject matter described herein. Any other format and type of document can be received as the input.

The input document 170 is provided to the document processing module 122, which is configured to process the text recognized from the document 170. Particularly, the document processing module 122 generates semantic feature representations 180 corresponding to a set of text elements presented in the document 170.

As used herein, a "document" can be any stored text in a natural language, such as an entire stored document or portion thereof. Some documents may include images from which text strings can be recognized, such as written, printed, or scanned copies of documents, or digitally-captured images. Other documents may include digital-born documents which can be any one or more of text files, PDF files, Extensive Markup Language (XML) files, or other structured or semi-structured document, or the like, from which a text string can be extracted.

A text element refers to a text unit to be processed in a NLP task and its granularity can be varied and predetermined depending on applications. As some examples, the text element may include a word, a phrase, a symbol, a combination or a part thereof, and/or any other element that is presented in natural language expression. Sometimes a text element may be referred to as a token in the NLP task.

A semantic feature representation (also referred to as a semantic representation, a semantic feature, or a text embedding) is used to characterize or encode an intuitive meaning or semantic of a text element within a text sequence of a natural language. The semantic feature representation can be in form of numerical vector. The semantic feature representation can be determined using a set of language modeling and feature learning techniques in NLP in which text elements from a vocabulary are mapped to real-number vectors based on their meanings, usage, and contexts relative to other text elements in the vocabulary. In turn, text elements with similar meanings have similar vectors and are in proximity to each another in vector space. Semantic feature representations can be used to facilitate one or more downstream processing tasks related to the text elements or the document, for example, to facilitate document understanding.

As mentioned briefly above, in accordance with implementations of the subject matter described herein, in addition to textual information, layout information indicating a spatial arrangement of text elements within a document is also determined for generating the semantic feature representations of the text elements. The layout information can capture the spatial relationship or layout among the text elements within the specific document, which can additionally contribute to the semantics of the text elements. For example, information in many forms is presented as key-value pairs, such as "DATE: 11/28/84," where the word "DATE" is the key and the symbol string "11/28/84" is the value. In general, the key-value pair is placed with a left-to-right or up-to-down arrangement in a certain format. Given a key in a form-style document, its corresponding value is much more likely on its right or below instead of on the left or above. Similarly, texts within spreadsheets are arranged in grid cells where the text indicating the table header is located in either the first row or the first column.

Therefore, utilizing the layout information to extract the semantic feature representations can help better align the spatial arrangement of the text elements with their semantics, which can thus benefit a great number of real-world applications in document analysis and understanding, such as financial report analysis, receipt understanding, certificate/license recognition, purchase order recognition, and the like.

Figure 2:
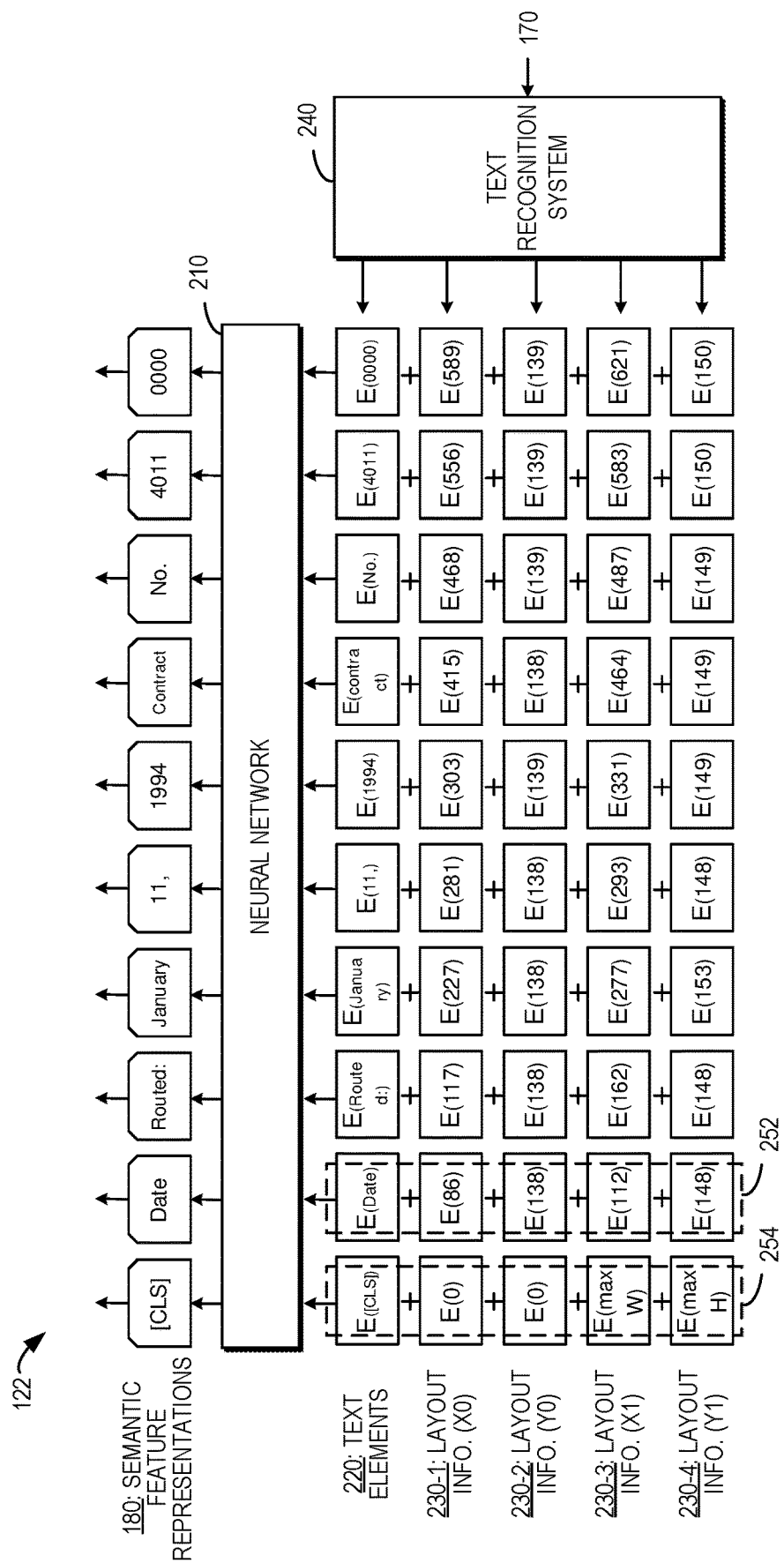
FIG. 2 illustrates a block diagram of a document processing module in accordance with an implementation of the subject matter described herein.

In the implementations of the subject matter described herein, the document processing module 122 can jointly process the textual information and the layout information across the document 170 to generate the semantic feature representations of the text elements. In some implementations, the document processing module 122 may utilize a deep learning model to encode the textual information and the layout information into the semantic feature representations. FIG. 2 illustrates an example structure of the document processing module 122 in accordance with some implementations of the subject matter described herein.

As shown, a text recognition system 240 is configured to extract the textual information comprising a sequence of text elements 220 and the layout information from the document 170. In the shown example, the layout information comprises four layout information elements 230-1, 230-2, 230-3, and 230-4, which will be discussed in detail below. For ease of discussion, the layout information can be collectively referred to as layout information 230 in the following. The text elements 220 and the layout information 230 are provided to a neural network 210 for generating semantic feature representations 180 of the respective text elements 220. The neural network 210 may also be referred to as a feature extraction neural network or model.

In some implementations, if the document 170 comprises an image, the text recognition system 240 may include an Optical Character Recognition (OCR) system to recognize the text presented in the image, i.e. converting the pixels of the image into the actual textual information appearing in the image. In addition to the OCR techniques, the text recognition system 240 may utilize other techniques, such as those based on convolutional neural network or deep neural network, to recognize the textual information from the image. Upon localization of the textual information, specifically, the text elements 220 comprised in the textual information in the image, the layout information 230 may also be determined. In some implementations, if the document 170 is digital born, the text elements 220 may be easily read or extracted with document editing tools or other automated tools. The layout information 230 may also be determined, for example, from metadata of the digital-born documents or otherwise extracted by analyzing presentations of the document 170. In other implementations, the text recognition system 240 in the document processing module 122 may receive the textual information that is recognized from the document 170 from other modules which implements the text recognition.

In some implementations, the textual information may be extracted from the document 170 line by line. As illustrated more clearly in FIG. 3, a text line area 320 is recognized and a set of text elements 220 in this area are determined, including "Date," "Routed:," "January," "11," "1994" "Contract," "No.," "4011," "0000" as shown in a table 330. Those text elements are provided as inputs to the neural network 210 for further processing. The text elements 220 in other areas of the document 170 may be further extracted and then processed.

In some implementations, to indicate the spatial arrangement of the text elements 220, the layout information 230 may indicate respective positions of the text elements within the document. It is worthwhile to note that unlike the position embedding that models the word positions in an input word sequence in many existing language models, the layout information 230 of the subject matter described herein aims to model a spatial position of each text element (e.g., a word) in the document 170.

To represent the respective positions of the text elements 220 within the document 170, the whole document 170 may be considered as a two-dimensional (2D) coordinate system with, for example, the top-left point as the origin. In such setting, the positions of the text elements can be defined within the 2D coordinate system as 2D positions. In some implementations, respective bounding boxes that bound the text elements 220 in the document 170 may be determined and the positions of the text elements 220 may be defined using the positions of the bounding boxes. The bounding boxes are generally used to localize regions of interest (ROIs) for recognition of the text elements, especially in the process of text recognition from an image. Thus, by reusing the bounding boxes, there is no need to perform an additional process to determine the layout information 230.

In an example, a position of a bounding box bounding a text element 220 may be defined by (x0, y0, x1, y1), where (x0, y0) corresponds to a 2D position of the upper left in the bounding box, and (x1, y1) represents a 2D position of the lower right in the bounding box. The position defined by (x0, y0, x1, y1) may be directly considered as a position of the text element 220. Such a position can not only define the positioning but also the size of the text element 220. The table 330 of FIG. 3 also shows a list of positions of bounding boxes corresponding to the recognized text elements. Accordingly, the layout information 230 may include a layout information element 230-1 corresponding to "x0," a layout information element 230-2 corresponding to "y0," a layout information element 230-3 corresponding to "x1," and a layout information element 230-4 corresponding to "y1," as illustrated in FIG. 2.

In some examples, in addition to the individual positions of the respective text elements 220 or as an alternative, the layout information 230 may further include information of an overall positioning range within the document 170. The positioning range indicates a range of possible positions of the textual information (including the respective text elements 220). The positioning range may be used to indicate overall layout information of the document 170. In an example, the positioning range may be defined by (0, 0, maxW, maxH), where (0, 0) indicates the coordinate origin (for example, the top-left point of the document 170) and (maxW, maxH) indicates the maximum coordinate values in width and height of the document 170 (for example, the bottom-right point of the document 170).

It would be appreciated that although a position format defined by (x0, y0, x1, y1) is provided, the positions of the text elements 220 may be defined in other ways, for example, by a 2D position of the center of the corresponding bounding box. In some implementations, the layout information 230 may include further information to indicate the sizes of the text elements 220 if required. The scope of the subject matter described herein is not limited in this regard.

The determined text elements 220 and layout information 230 are provided as inputs to the neural network 210. To enable the processing in the neural network 210, the text elements 220 and the layout information 230 may be represented as corresponding embeddings which are then used as inputs to the neural network 210.

As used herein, an embedding is a numerical representation of a text element or a layout information element with a predetermined size. Different text elements and layout information elements are mapped to different embeddings. As compared with the semantic feature representations 180, the embeddings are mapped from the discrete elements based on predefined mappings between elements and predetermined embeddings. As such, the individual embeddings or their combination cannot well represent the semantics of the text elements in the context of the textual information or the document as compared with the semantic feature representations.

In some implementations, each text element 220 may be mapped into an embedding, which may be referred to as a text element embedding, or a word embedding or phrase embedding if the text element is a word or phrase. The text element embedding is represented as "$E(x)$" shown in FIG. 2, where "x" indicates the text element. The mapping of the text elements 220 to the text element embeddings may be performed based on a predetermined mapping table between text elements to text element embeddings. In some examples, in addition to the text elements 220 presented in the document 170, a special marker represented as "CLS" is additionally included into the sequence of text elements 220, for example, at the start of the sequence. The embedding of the special marker "CLS" may be predetermined and represented as "$E_{([CLS])}$." It would be appreciated that this special marker can be omitted in other examples.

The layout information 230 may be divided into layout information elements, each layout information element being mapped to an embedding, which may also be referred to as a layout information embedding. In the example of the position of a text element being defined by (x0, y0, x1, y1), four embedding layers are incorporated to generate embeddings corresponding to layout information elements "x0" 230-1, "y0" 230-2, "x1" 230-3, and "y1" 230-4, which may be referred to as 2D position embeddings. The layout information embeddings are represented as "$E(x0)$," "$E(y0)$," "$E(x1)$," and "$E(y1)$" as shown in FIG. 2, where "x0," "y0," "x1," and "y1" indicates the specific coordinate values in the positions of the text elements 220. In some implementations, the positioning range, such as (0, 0, maxW, maxH), may also be mapped to a 2D position embedding which is represented as "$E(0)$," "$E(0)$," "$E(maxW)$," and "$E(maxH)$."

The transforming from the layout information elements to the 2D position embeddings may be similarly performed based on a predetermined mapping table between layout information elements to embeddings. For the positions defined by (x0, y0, x1, y1), including the positioning range (0, 0, maxW, maxH), two predetermined mapping tables may be used, where "x0" and "x1" may be mapped to corresponding embeddings using a mapping table, while "y0" and "y1" may be mapped to corresponding embeddings using another mapping table.

After the embedding conversion, for each text element, the corresponding text element embedding and layout information embeddings may be combined (for example, summed) together to input to the neural network 210. For example, for the text element "Date" recognized from the document 170, a resulting combination 252 of embeddings is obtained. The combinations of embeddings for other text elements can be similarly obtained. A combination 254 of embeddings shown in FIG. 2 is corresponding to the whole document 170, including the text element embedding of the special marker "CLS" and the 2D position embedding of the overall positioning range represented as "E(0)," "E(0)," "E(maxW)." The combinations of the embeddings may be provided to the neural network 210 in a certain order of the text elements 220 presenting in the document 170.

The neural network 210 is configured to process the text elements 220 and the layout information 230, or more specifically, their embeddings, in order to extract the semantics of the text elements 220. The neural network 210 may be a language model with any model architecture that is suitable for generating semantic feature representations. In some implementations, the neural network 210 may be a type of pre-trained model. In some implementations, the neural network 210 may also be referred to as an encoder which encodes the textual elements into the semantic feature representations.

An example of the neural network 210 includes a Bidirectional Encoder Representation from Transformers (BERT) model. The BERT model is an attention-based bidirectional language modeling approach. It has been verified that the BERT model shows effective knowledge transfer from the self-supervised task with large-scale training data. The architecture of BERT is basically a multi-layer bidirectional Transformer encoder. The model accepts a sequence of discrete tokens and stacks multiple layers to produce final representations. To generate the semantic feature representations, the input embeddings are passed through a multi-layer bidirectional Transformer that can generate semantic feature representations with an adaptive attention mechanism.

Other examples of the neural network 210 include, but are not limited to, variant models based on multi-layer bidirectional transformer encoders, an Embeddings from Language Model (ELMo) model, a Generative Pre-Training (GPT) model, an Enhanced Language Representation with Informative Entities (ERNIE) model, other models based on neural networks or other deep learning models such as a long short-term memory (LSTM), a Recurrent neural network (RNN) model, and the like.

In some implementations, to obtain the capability of generating accurate semantic feature representations from input text elements and their layout information, the neural network 210 may be pre-trained using a large scale of training data. The training data may include various sample text elements extracted from sample documents and sample layout information corresponding to various sequences of the sample text elements. In some implementations, the pre-training of the neural network 210 may be performed externally or remotely and the computing device 100 can directly obtain the pre-trained neural network 210 for further fine-tuning (as will be described below) or use in generating the semantic feature representations for processing tasks related to the document 170. In other implementations, the computing device 100 may implement the pre-training of the neural network 210.

To improve the versatility of the neural network 210 in various downstream processing tasks, the training data for pre-training the neural network 210 may include various categories of sample documents, including letter, memo, email, file folder, form, handwritten, invoice, advertisement, budget, news articles, presentation, scientific publication, questionnaire, resume, scientific report, specification and many others, which is useful for large-scale self-supervised pre-training.

In some implementations, the neural network 210 may be pre-trained in a self-supervised manner. In performing the self-supervised pre-training, one objective to learn semantic feature representations from the training data may be based on masked language modeling. Specifically, during the pre-training, one or more of a sequence of sample text elements are masked but the remaining text elements in the sequence and the corresponding layout information remain unmasked. The neural network 210 is trained to predict the masked one or more sample text elements (for example, their embeddings) given the unmasked text elements and layout information (for example, their embeddings). In this way, the neural network 210 can not only understand the language contexts but also utilize the spatial arrangement, thereby bridging the gap between the visual and language modalities. Such masked language modeling may be referred to as masked visual-language modeling (MVLM) as the semantic feature representations are learned with the clues of both layout information and textual information.

In some implementations, in addition to the MVLM objective, another objective of the pre-training may be based on a multi-label document classification (MDC) loss. Given a set of sample documents, the supersized information includes document tags indicating different categories of the sample documents. During the pre-training, the neural network 210 is trained to cluster the knowledge from the different categories and generate better document-level feature representations to facilitate better results in document classification. It would be appreciated that the MDC loss may not be necessary for the pre-training of the neural network 210.

In the implementations described above, the layout information 230 as well as the textual information from the document 170 is utilized to generate the semantic feature representations 180. In some implementations, individual visual appearances of the text elements 220 in the document 170 and/or an overall visual appearance of the whole document 170 are also important hints and can also contribute to the semantics of the text elements 220 in the document 170.

In typical use cases, documents contain some visual signals to show the importance and priority of document segments. For example, the text elements 220 may be designed with one or more formats, such as fonts, sizes, directions, types, italics, colors, underlines, and/or other highlights. For example, in many form-style documents, the key in the key-value pair may be highlighted in bold. In many passages, the titles may be presented in bold with a larger font size and some special conceptual terms may be presented in italics. In addition, different categories of documents may have significant visual differences. For example, personal resumes and scientific literatures have different designs visually.

Figure 4:
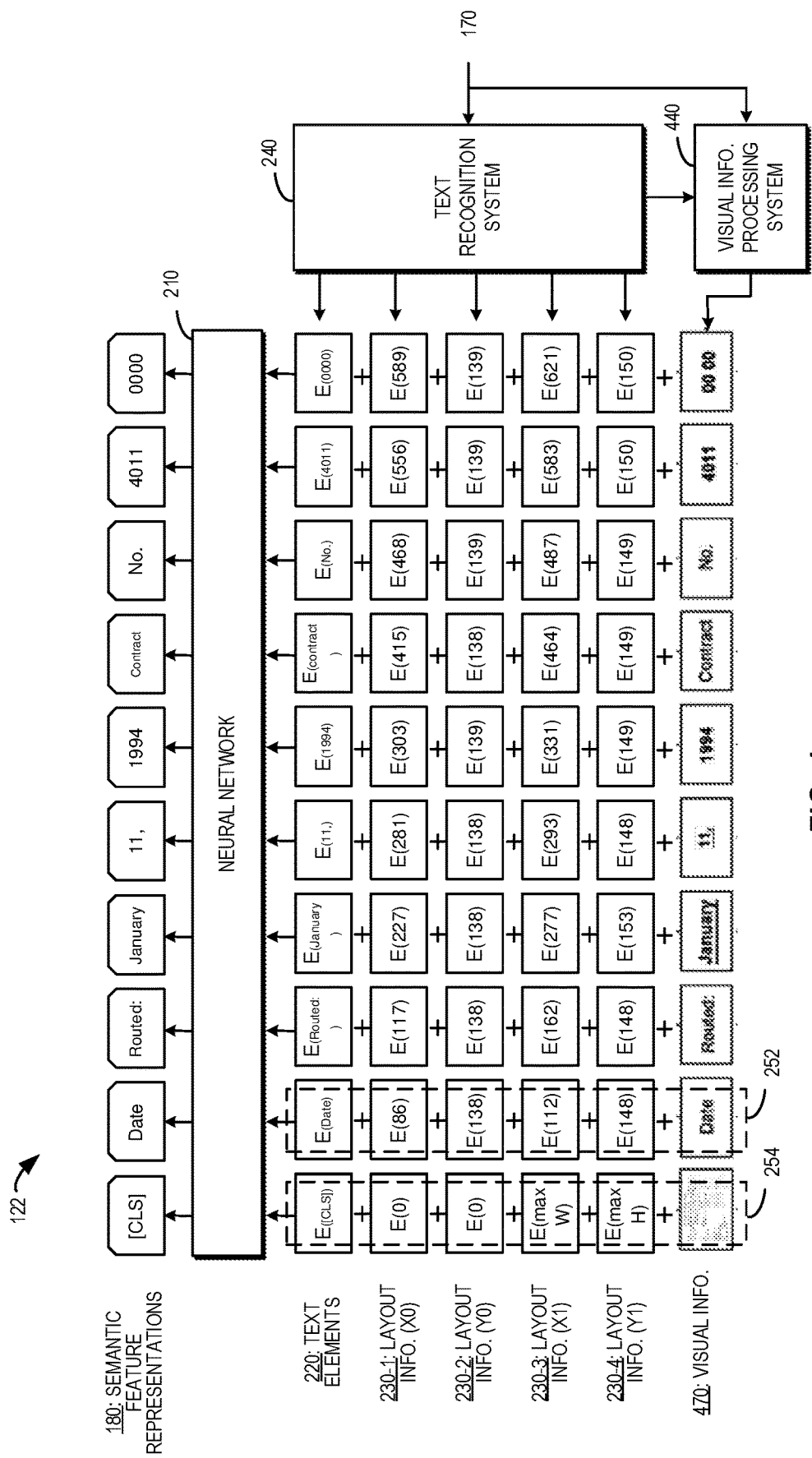
FIGS. 4-6 illustrate block diagrams of some examples of the document processing module in accordance with an implementation of the subject matter described herein.

Therefore, in some implementations, visual information from the document 170 may also leveraged to generate the semantic feature representations 180 of the text elements 220. FIG. 4 illustrates a further example structure of the document processing module 122 in accordance with such implementations. In this example, visual information 470 is further determined from the document 170 and then utilized to generate the semantic feature representations 180.

The visual information 470 may include information indicating respective visual appearances of the text elements 220 presented in the document 170. Alternatively, or in addition, the visual information 470 may include information indicating an overall visual appearance of the document 170. The visual appearances of the individual text elements 220 and the document 170 may be varied due to different formats applied to the text elements 220 and/or the document 170, such as different fonts, sizes, text directions, types, italics, colors, underlines, other highlights, margins, page orientation, indents, spacing, and/or other applicable formats.

In some implementations, to indicate the visual appearances of the text elements 220, the visual information 470 may include information of one or more formats of each of the text elements 220, such as the respective fonts, sizes, text directions, types, italics, colors, underlines, other highlights, spacing, and/or any other formats that can be applied to the individual text elements. In some implementations, to indicate the overall visual appearance of the document 170, the visual information 470 may include information of one or more formats applied to the document 170, such as the page color, the margins, page orientation, indents, spacing, and/or any other applicable formats.

In some implementations, the visual information 470 may also be determined based on metadata of the document 170 if the document 170 is in a digital-born form. The metadata of the document 170 may include information describing the formats of the text elements 430 and/or the document 170. The visual information 470, if being determined from the metadata, may be represented as embeddings according to a predefined mapping table, similarly to the embeddings of the textual information and layout information as discussed above.

In some implementations, the visual information 470 may be determined using an image processing technique, for example, if the text elements 220 are recognized from an image comprised in the document 170 or if the metadata of the digital-born document 170 is unavailable. Specifically, image blocks presenting the text elements 220 may be extracted from the document 170 for processing. An image block may include, for example, the image block of the bounding box used to recognize the corresponding text element 220, or any other image patch that contain the text element 220. As further illustrated in FIG. 3, the image blocks corresponding to the respective text elements 220 are listed in the table 330. The whole document 170 may be considered as an image for processing, in order to determine the information indicating the overall visual appearance of the document 170. In the case that the document 170 is digital born, it may be converted to an image.

To enable the processing in the neural network 210, the respective image blocks corresponding to the text elements 220 and/or the image of the document 170 may be processed by a visual information processing system 440 incorporated in the document processing module 122. The visual information processing system 440 is configured to generate visual feature representations characterizing the respective visual appearances of the text elements 220 in the document 170, and/or an overall visual feature representation of the whole document 170. Similar as a semantic feature representation, a visual feature representation can be in form of real-number vector.

The visual information processing system 440 may be implemented with a trained deep learning model, such as a neural network that is suitable for processing images. Some examples of the neural network include, but are not limited to, a convolutional neural network (CNN) model, variations based on CNN, such as a region-CNN (R-CNN), a fast R-CNN, or a faster R-CNN, or any other model that is suitable for processing image information. The neural network used by the visual information processing system 440 may also be referred to as an image feature extraction neural network or model.

Through the visual information processing system 440, the visual feature representations can characterize visual features of the text elements 220 and/or the whole document 170, and thus the formats applied to the text elements 220 and/or the document 170 can be implicitly characterized in the corresponding visual feature representations and used to facilitate the generation of the semantic feature representations of the text elements 220. In addition to the formats, other visual appearances of the text elements 220 and/or the document 170, such as their textures, shading, brightness, and/or the like, may also be characterized in the corresponding visual feature representations output from the visual information processing system 440.

The visual feature representations of the image blocks of the text elements 220 and/or the whole image of the document 170 may be used as the inputs to the neural network 210 for further processing. The visual feature representations of the image blocks of the text elements 220 may have a one-to-one correspondence with the embeddings of the text elements 220 and the layout information 230. For example, the combination 252 of embeddings corresponding to the text element "Date" is extended to include the visual representation of the image block presenting this text element. The combinations of embeddings for other text elements can be similarly obtained. The overall visual feature representation of the whole document 170 may be combined with the text element embedding of the special marker "CLS" and the 2D position embedding of the overall positioning range represented as "E(0)," "E(0)," "E(maxW)," to form the combination 254 of embeddings, as shown in FIG. 4.

Although both the layout information 230 and the visual information 470 are determined as additional rich information to enhance the generation of the semantic feature representations 180 as illustrated in FIG. 4, in some implementations, the layout information 230 may be omitted. The combination of the visual information and the textual information can also help capture more accurate semantics among the text elements 220 contextualized in the document 170. Such combination may be beneficial in applications where the visual appearances of the documents are rich while the layouts have limited variations, such as in spreadsheet documents.

In some implementations, the semantic feature representations 180 of the text elements 220 may be provided for use in various downstream processing tasks related to the document 170 as most of the processing tasks related to the document 170 may require understanding of the semantic meanings of the textual information presented therein. In some implementations, a downstream processing task may be performed in a same computing device, e.g., the computing device 100, which uses the neural network 210 to generate the semantic feature representations 180. In other implementations, the downstream processing task may be performed by one or more other computing devices to which the semantic feature representations 180 may be provided by the computing device 100. For ease of discussion, in the following, the implementation of the downstream processing task is illustrated as being incorporated in the document processing module 122 of the computing device 100.

Figure 5:
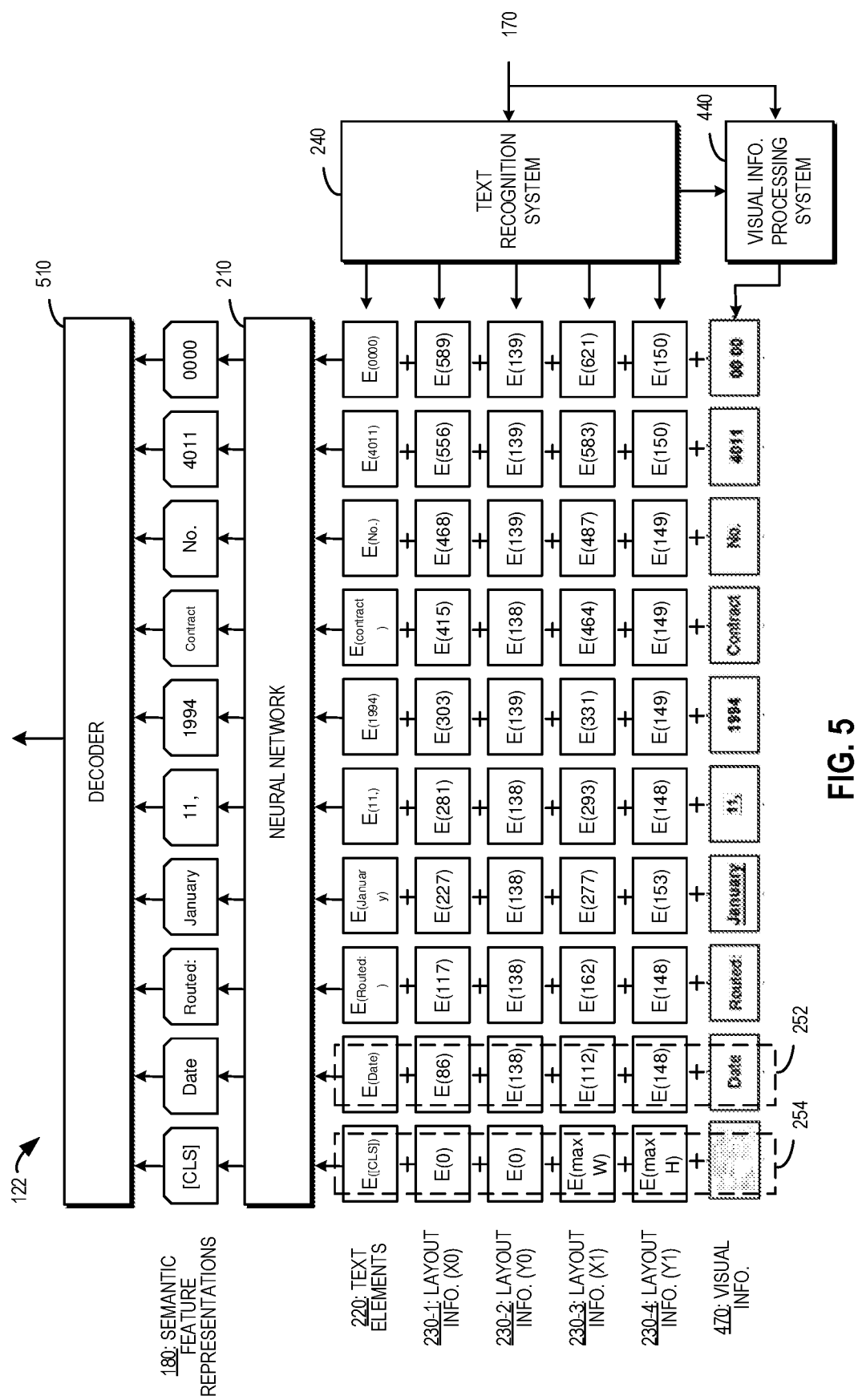

FIG. 5 illustrates a further example structure of the document processing module 122 in which a downstream processing task is to be performed. In the example of FIG. 5, the downstream processing task may be performed using a further neural network, referred to as a decoder 510. As illustrated, the semantic features representations 180 are provided to the decoder 510 for use in performing the downstream processing task.

The decoder 510 may be configured depending on the type of the downstream processing task to be processed so as to provide the corresponding output expected in the task. In some implementations, the decoder 510 may include one or more aggregation layers such as full-connected (FC) layers, one or more liner layers, a softmax layer, and/or the like, which can aggregate the semantic feature representations 180 to generate the output for the downstream processing tasks. The configuration of the decoder 510 is not limited in the scope of the subject matter described herein.

In some implementations, the downstream processing task may include any type of tasks related to document understanding, including, for example, form understanding, receipt understanding, document classification, and/or the like.

Specifically, the task of form understanding may be performed if the document 170 is a form-style document. This task requires extracting and structuring the textual content of forms. It aims to extract key-value pairs from the scanned or digital form images. In more detail, this task includes two sub-tasks: semantic labeling and semantic linking, both requiring accurate semantics of the text elements 220 in the document 170. Semantic labeling is the task of aggregating text elements as semantic entities and assigning predefined labels to them. Semantic linking is the task of predicting the relations between semantic entities. Thus, in performing the task of form understanding, the decoder 510 outputs indications of the predefined labels assigned to the text elements 220.

The task of receipt understanding may be performed if the document 170 is a receipt document. This task requires filling several pre-defined semantic slots according to the receipt document. For instance, given a set of receipts, specific slots such as the company, address, date, and total are all filled. Different from the form understanding task that requires labeling all matched entities and key-value pairs, the number of semantic slots is fixed with pre-defined keys. Therefore, the decoder 510 only needs to predict the corresponding values of the semantic slots based on the semantic feature representations 180 using the sequence labeling method.

The task of document classification is to predict the corresponding category for each document and assign one or more categorical labels to the document. Examples of document classification include topic categorization, sentiment analysis, and formality studies. To perform the document classification, in addition to the semantic feature representations 180, the overall visual feature representation of the whole document 170 or the image of the document 170 is also passed to the decoder 510.

It would be appreciated that only some examples of the downstream processing tasks are listed and described above. Various other processing tasks related to the document 170 may also be performed with the use of the semantic feature representations 180.

In some implementations, the neural network 210 may be pre-trained, as described above, and fine-tuned together with the decoder 510 in order to perform a specific downstream processing task. During the fine-tuning process, the parameter sets of both the neural network 210 and the decoder 510 are updated in an end-to-end way based on task-specific training data. Through the two phases of pre-training and fine-tuning, the neural network 210 is capable of generating semantic feature representations 180 more suitable for certain downstream processing tasks.

Figure 6:
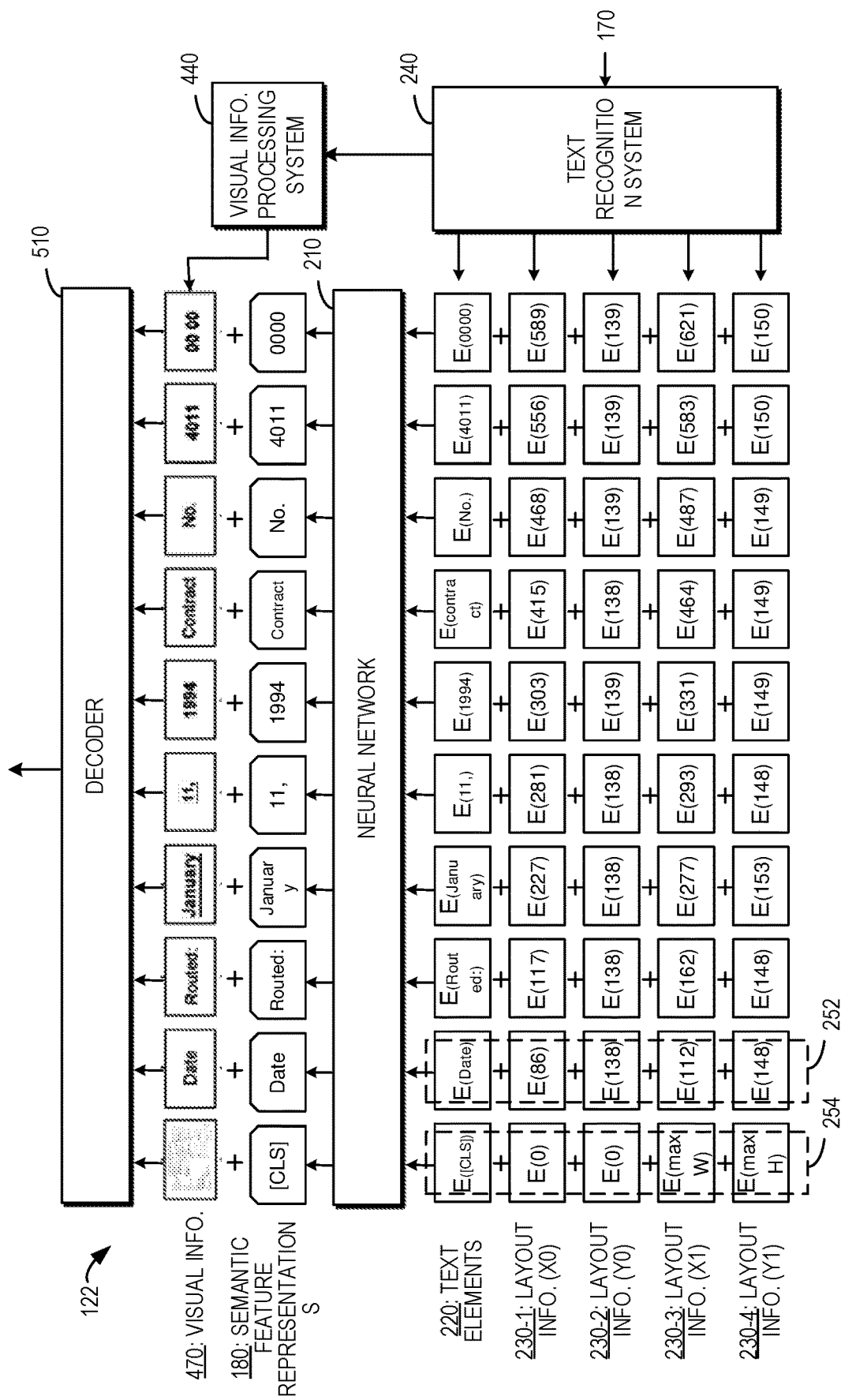

In some implementations, instead of being combined with the layout information 230 and the text elements 220 to generate the semantic feature representations 180 as illustrated in FIG. 5, the visual information 470 may be combined with the generated semantic feature representations 180 for use in performing one or more downstream processing tasks. FIG. 6 illustrates an example structure of the document processing module 122 in accordance with such implementations.

As compared with the example illustrated in FIG. 5, the difference is that the visual information 470 is removed from the inputs to the neural network 210 and is combined with the semantic feature representations 180 as inputs to the decoder 510, as illustrated in FIG. 6. The determination of the visual information 470 has been described above and thus is omitted here. By using the visual information 470 in this way, the visual features in the document 170 can be effectively utilized in the document analysis together with the semantic feature representations.

Figure 7:
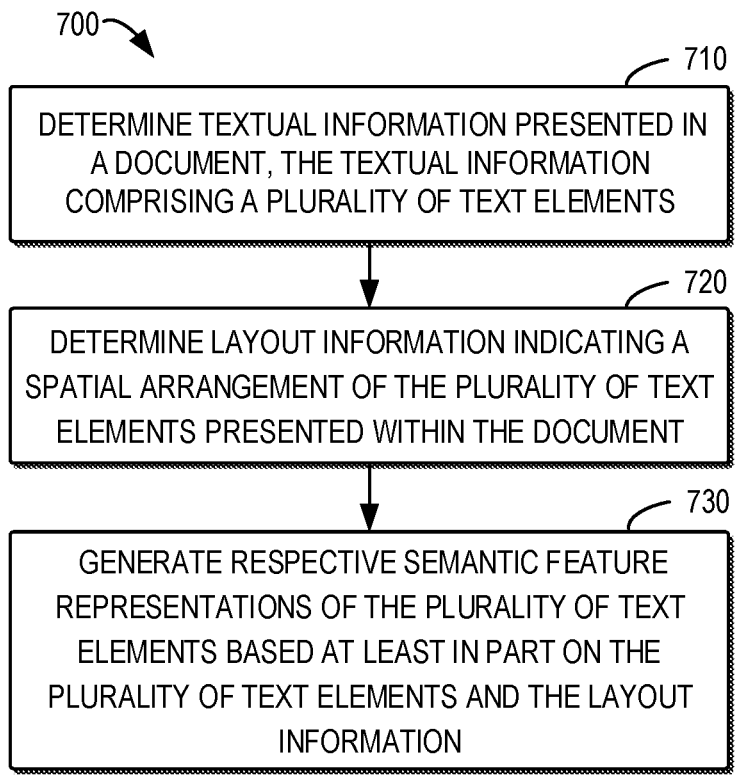
FIG. 7 illustrates a flowchart of a process in accordance with an implementation of the subject matter described herein.

FIG. 7 illustrates a flowchart of a process 700 in accordance with some implementations of the subject matter described herein. The process 700 can be implemented by the computing device 70, for example, by the document processing module 122 in the memory 120 of the computing device 100.

At block 710, the computing device 100 determines textual information presented in a document, the textual information comprising a plurality of text elements. At block 720, the computing device 100 determines layout information indicating a spatial arrangement of the plurality of text elements presented within the document. At block 730, the computing device 100 generates respective semantic feature representations of the plurality of text elements based at least in part on the plurality of text elements and the layout information.

In some implementations, the layout information may indicate at least one of the following: respective positions of the plurality of text elements within the document, and a positioning range of the textual information within the document.

In some implementations, the document may comprise an image and the image comprises the plurality of text elements. In some implementations, if the layout information comprises the respective positions of the plurality of text elements, in determining the layout information, the computing device 100 may determine a plurality of bounding boxes bounding the plurality of text elements in the image and determines respective positions of the plurality of bounding boxes in the image as the respective positions of the plurality of text elements.

In some implementations, the computing device 100 may further determine visual information related to the text elements and/or the document and generate the semantic feature representations further based on the visual information. The visual information may indicate at least one of the following: respective visual appearances of the plurality of text elements presented in the document, and an overall visual appearance of the document. In some implementations, the visual information may comprise at least one of the following: information of respective formats of the plurality of text elements, and information of a format of the document.

In some implementations, if the visual information indicates the respective visual appearances, the visual information may be determined by extracting a plurality of image blocks presenting the plurality of text elements in the document and generating a plurality of visual feature representations characterizing the visual appearances of the plurality of image blocks. In some examples, the visual feature representations may be generated using a corresponding trained neural network.

In some implementations, the computing device 100 may provide the respective semantic feature representations to a decoder which is configured to perform a downstream processing task related to the document. The decoder may perform the task using the semantic feature representations. In some implementations, the computing device 100 may further determine visual information related to the text elements and/or the document and provide the visual information to the decoder for performing the downstream processing tasks. As mentioned above, the visual information may indicate at least one of the following: respective visual appearances of the plurality of text elements presented in the document, and an overall visual appearance of the document, and the visual information may comprise at least one of the following: information of respective formats of the plurality of text elements, and information of a format of the document.

In some implementations, the computing device 110 may apply the plurality of text elements and the layout information as an input to a neural network to generate the semantic feature representations. In some implementations, the neural network may be pre-trained based on a plurality of sample text elements in a sample image and sample layout information indicating a layout of the plurality of sample text elements presented within the sample image. The pre-training of the neural network may be performed by: masking at least one of the plurality of sample text elements, and training the neural network to predict the at least one masked sample text element given remaining ones of the plurality of sample text elements and the sample layout information.

In some implementations, the pre-trained neural network may be fine-tuned with a decoder configured to perform a downstream processing task related to the document, to obtain the trained neural network.

Some example implementations of the subject matter described herein are listed below.

In a first aspect, the subject matter described herein provides an electronic device. The device comprises a processing unit; and a memory coupled to the processing unit and having instructions stored thereon, the instructions, when executed by the processing unit, causing the device to perform acts comprising: determining textual information presented in a document, the textual information comprising a plurality of text elements; determining layout information indicating a spatial arrangement of the plurality of text elements presented within the document; and generating respective semantic feature representations of the plurality of text elements based at least in part on the plurality of text elements and the layout information.

In some implementations, the layout information indicates at least one of the following: respective positions of the plurality of text elements within the document, and a positioning range of the textual information within the document.

In some implementations, the document comprises an image and the image comprises the plurality of text elements. In some implementations, the layout information comprises the respective positions of the plurality of text elements, and determining the layout information comprises: determining a plurality of bounding boxes bounding the plurality of text elements in the image; and determining respective positions of the plurality of bounding boxes in the image as the respective positions of the plurality of text elements.

In some implementations, the acts further comprise determining visual information indicating at least one of the following: respective visual appearances of the plurality of text elements presented in the document, and an overall visual appearance of the document. In some implementations, the visual information comprises at least one of the following: information of respective formats of the plurality of text elements, and information of a format of the document. In some implementations, generating the semantic feature representations further comprises: generating the semantic feature representations further based on the visual information.

In some implementations, the visual information indicates the respective visual appearances, and determining the visual information comprises: extracting a plurality of image blocks presenting the plurality of text elements in the document; and generating a plurality of visual feature representations characterizing the visual appearances of the plurality of image blocks.

In some implementations, the acts further comprise: providing the respective semantic feature representations to a decoder, the decoder configured to perform a downstream processing task related to the document.

In some implementations, the acts further comprise: providing visual information to the decoder, the visual information indicating at least one of the following: respective visual appearances of the plurality of text elements presented in the document, and an overall visual appearance of the document.

In some implementations, generating the semantic feature representations comprises: determining the semantic feature representations by applying the plurality of text elements and the layout information as an input to a neural network.

In some implementations, the neural network is pre-trained based on a plurality of sample text elements in a sample image and sample layout information indicating a layout of the plurality of sample text elements presented within the sample image, and wherein the pre-training of the neural network is performed by: masking at least one of the plurality of sample text elements, and training the neural network to predict the at least one masked sample text element given remaining ones of the plurality of sample text elements and the sample layout information.

In some implementations, the pre-trained neural network is fine-tuned with a further neural network configured to perform a downstream processing task related to the document, to obtain the trained neural network.

In a second aspect, the subject matter described herein provides a computer-implemented method. The method comprises: determining textual information presented in a document, the textual information comprising a plurality of text elements; determining layout information indicating a spatial arrangement of the plurality of text elements presented within the document; and generating respective semantic feature representations of the plurality of text elements based at least in part on the plurality of text elements and the layout information.

In some implementations, the layout information indicates at least one of the following: respective positions of the plurality of text elements within the document, and a positioning range of the textual information within the document.

In some implementations, the document comprises an image and the image comprises the plurality of text elements. In some implementations, the layout information comprises the respective positions of the plurality of text elements, and determining the layout information comprises: determining a plurality of bounding boxes bounding the plurality of text elements in the image; and determining respective positions of the plurality of bounding boxes in the image as the respective positions of the plurality of text elements.

In some implementations, the method further comprises determining visual information indicating at least one of the following: respective visual appearances of the plurality of text elements presented in the document, and an overall visual appearance of the document. In some implementations, the visual information comprises at least one of the following: information of respective formats of the plurality of text elements, and information of a format of the document. In some implementations, generating the semantic feature representations further comprises: generating the semantic feature representations further based on the visual information.

In some implementations, the visual information indicates the respective visual appearances, and determining the visual information comprises: extracting a plurality of image blocks presenting the plurality of text elements in the document; and generating a plurality of visual feature representations characterizing the visual appearances of the plurality of image blocks.

In some implementations, the method further comprises: providing the respective semantic feature representations to a decoder, the decoder configured to perform a downstream processing task related to the document.

In some implementations, the acts further comprise: providing visual information to the decoder, the visual information indicating at least one of the following: respective visual appearances of the plurality of text elements presented in the document, and an overall visual appearance of the document.

In some implementations, generating the semantic feature representations comprises: determining the semantic feature representations by applying the plurality of text elements and the layout information as an input to a neural network.

In some implementations, the neural network is pre-trained based on a plurality of sample text elements in a sample image and sample layout information indicating a layout of the plurality of sample text elements presented within the sample image, and wherein the pre-training of the neural network is performed by: masking at least one of the plurality of sample text elements, and training the neural network to predict the at least one masked sample text element given remaining ones of the plurality of sample text elements and the sample layout information.

In some implementations, the pre-trained neural network is fine-tuned with a further neural network configured to perform a downstream processing task related to the document, to obtain the trained neural network.

In a third aspect, the subject matter described herein provides a computer program product being tangibly stored on a non-transient computer storage medium and comprising machine-executable instructions which, when executed by a device, cause the device to perform one or more implementations of the above method.

In a fourth aspect, the subject matter described herein provides a computer readable medium having machine-executable instructions stored thereon which, when executed by a device, cause a device to perform one or more implementations of the above method.

The functionalities described herein can be performed, at least in part, by one or more hardware logic components. For example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A device for determining a semantic representation of text in a document, comprising:
   a processing unit; and
   a memory coupled to the processing unit and having instructions stored thereon, the instructions, when executed by the processing unit, causing the device to perform acts comprising:
   determining textual information presented in the document, the textual information comprising a plurality of text elements;
   determining layout information indicating a spatial arrangement of the plurality of text elements presented within the document;
   generating respective semantic feature representations of the plurality of text elements based at least in part on the plurality of text elements and the layout information;
   determining, using a visual information processing system, visual information of the textual information, the visual information indicating at least one: respective visual appearances of the plurality of text elements presented in the document, and an overall visual appearance of the document;
   combining the respective semantic feature representations of the plurality of text elements with the visual information as an input to a decoder; and
   performing, using the decoder, a downstream processing task for document understanding based on the respective semantic feature representations of the plurality of text elements and the visual information, the document understanding comprising form understanding, receipt understanding, and document classification;
      wherein form understanding comprises extracting and structuring the textual content of forms;
      wherein receipt understanding comprises filling several pre-defined semantic slots according to the document; and
      wherein document classification is to predict the corresponding category for each document and assign one or more categorical labels to the document.

2. The device of claim 1, wherein the layout information indicates at least one of the following: respective positions of the plurality of text elements within the document, and a positioning range of the textual information within the document.

3. The device of claim 2, wherein the document comprises an image and the image comprises the plurality of text elements, and
   wherein the layout information comprises the respective positions of the plurality of text elements, and determining the layout information comprises:
   determining a plurality of bounding boxes bounding the plurality of text elements in the image; and
   determining respective positions of the plurality of bounding boxes in the image as the respective positions of the plurality of text elements.

4. The device of claim 1, wherein the acts further comprise:
   determining visual information indicating at least one of the following: respective visual appearances of the plurality of text elements presented in the document, and an overall visual appearance of the document; and
   wherein generating the semantic feature representations further comprises:
   generating the semantic feature representations further based on the visual information.

5. The device of claim 4, wherein the visual information comprises at least one of the following:
   information of respective formats of the plurality of text elements, and information of a format of the document.

6. The device of claim 4, wherein the visual information indicates the respective visual appearances, and determining the visual information comprises:
   extracting a plurality of image blocks presenting the plurality of text elements in the document; and
   generating a plurality of visual feature representations characterizing the visual appearances of the plurality of image blocks.

7. The device of claim 1, wherein generating the semantic feature representations comprises:
   determining the semantic feature representations by applying the plurality of text elements and the layout information as inputs to a neural network.

8. The device of claim 7, wherein the neural network is pre-trained based on a plurality of sample text elements in a sample image and sample layout information indicating a layout of the plurality of sample text elements presented within the sample image, and wherein the pre-training of the neural network is performed by:
   masking at least one of the plurality of sample text elements, and
   training the neural network to predict the at least one masked sample text element given remaining ones of the plurality of sample text elements and the sample layout information.

9. A computer-implemented method for determining a semantic representation of text in a document comprising:
   determining textual information presented in the document, the textual information comprising a plurality of text elements;
   determining layout information indicating a spatial arrangement of the plurality of text elements presented within the document;
   generating respective semantic feature representations of the plurality of text elements based at least in part on the plurality of text elements and the layout information;
   determining, using a visual information processing system, visual information of the textual information, the visual information indicating at least one: respective visual appearances of the plurality of text elements presented in the document, and an overall visual appearance of the document;
   combining the respective semantic feature representations of the plurality of text elements with the visual information as an input to a decoder; and
   performing, using the decoder, a downstream processing task for document understanding based on the respective semantic feature representations of the plurality of text elements and the visual information, the document understanding comprising form understanding, receipt understanding, and document classification;
      wherein form understanding comprises extracting and structuring the textual content of forms;

wherein receipt understanding comprises filling several pre-defined semantic slots according to the document; and wherein document classification is to predict the corresponding category for each document and assign one or more categorical labels to the document.

10. The method of claim 9, wherein the layout information indicates at least one of the following: respective positions of the plurality of text elements within the document, and a positioning range of the textual information within the document.

11. The method of claim 10, wherein the document comprises an image and the image comprises the plurality of text elements, and wherein the layout information comprises the respective positions of the plurality of text elements, and determining the layout information comprises:

determining a plurality of bounding boxes bounding the plurality of text elements in the image; and determining respective positions of the plurality of bounding boxes in the image as the respective positions of the plurality of text elements.

12. The method of claim 9, further comprising:

determining visual information indicating at least one of the following: respective visual appearances of the plurality of text elements presented in the document, and an overall visual appearance of the document; and wherein generating the semantic feature representations further comprises:

generating the semantic feature representations further based on the visual information.

13. The method of claim 9, wherein the decoder comprises one or more aggregation layers.

14. The method of claim 9, wherein the decoder outputs an indication of a predefined label assigned to a text element.

15. The method of claim 9, further comprising:

applying the plurality of text elements and the layout information as inputs to a neural network to train the neural network; and updating parameter sets of the neural network and the decoder based on task-specific training data.

16. The method of claim 15, wherein the neural network is trained to predict masked sample text elements given unmasked text elements and layout information using a masked visual-language modeling where the semantic feature representations are based on both layout information and textual information.

17. A computer program product being tangibly stored on a non-transitory computer-readable storage medium and comprising computer-executable instructions which, when executed by a device, cause the device to perform acts for determining a semantic representation of text in a document comprising:

determining textual information presented in the document, the textual information comprising a plurality of text elements;

determining layout information indicating a spatial arrangement of the plurality of text elements presented within the document;

generating respective semantic feature representations of the plurality of text elements based at least in part on the plurality of text elements and the layout information;

determining, using a visual information processing system, visual information of the textual information, the visual information indicating at least one: respective visual appearances of the plurality of text elements presented in the document, and overall visual appearance of the document;

combining the respective semantic feature representations of the plurality of text elements with the visual information as an input to a decoder; and performing, using the decoder, a downstream processing task for document understanding based on the respective semantic feature representations of the plurality of text elements and the visual information, the document understanding comprising form understanding, receipt understanding, and document classification;

wherein form understanding comprises extracting and structuring the textual content of forms;

wherein receipt understanding comprises filling several pre-defined semantic slots according to the document; and wherein document classification is to predict the corresponding category for each document and assign one or more categorical labels to the document.

* * * * *